United States Patent
Oriol Margarit et al.

(10) Patent No.: US 11,525,559 B2
(45) Date of Patent: Dec. 13, 2022

(54) SET COMPRISING A PLUG CONNECTABLE LED AND A PHOTOCURABLE COMPOSITION

(71) Applicant: AFINITICA TECHNOLOGIES, S. L., Cerdanyola del Vallès (ES)

(72) Inventors: Carles Oriol Margarit, Cerdanyola del Vallès (ES); Ciaran McArdle, Cerdanyola del Vallès (ES); Juan Andrés López Maeso, Cerdanyola del Vallès (ES)

(73) Assignee: AFINITICA TECHNOLOGIES, S. L., Cerdanyola del Vallès (ES)

( * ) Notice: Subject to any disclaimer, the term of this patent is extended or adjusted under 35 U.S.C. 154(b) by 663 days.

(21) Appl. No.: 16/479,369

(22) PCT Filed: Jan. 25, 2017

(86) PCT No.: PCT/IB2017/050373
§ 371 (c)(1),
(2) Date: Jul. 19, 2019

(87) PCT Pub. No.: WO2018/138547
PCT Pub. Date: Aug. 2, 2018

(65) Prior Publication Data
US 2019/0353333 A1 Nov. 21, 2019

(51) Int. Cl.
| | | |
|---|---|---|
| *F21V 1/00* | (2006.01) | |
| *C08F 2/50* | (2006.01) | |
| *F21V 19/00* | (2006.01) | |
| *C08F 20/18* | (2006.01) | |
| *C08F 20/34* | (2006.01) | |
| *C08K 5/5397* | (2006.01) | |
| *C08K 5/56* | (2006.01) | |
| *F21K 9/00* | (2016.01) | |
| *B05D 3/06* | (2006.01) | |

(52) U.S. Cl.
CPC ............ *F21V 19/0025* (2013.01); *C08F 2/50* (2013.01); *C08F 20/18* (2013.01); *C08F 20/34* (2013.01); *C08K 5/5397* (2013.01); *C08K 5/56* (2013.01); *F21K 9/00* (2013.01); *B05D 3/06* (2013.01); *B05D 3/067* (2013.01); *C08L 2203/20* (2013.01)

(58) Field of Classification Search
CPC ... F21V 19/0025; B29C 35/0808; F21K 9/00; C08F 2/50; C08F 20/34; C08F 20/18; C08L 2203/20; C08K 5/5397; C08K 5/56
See application file for complete search history.

(56) References Cited

U.S. PATENT DOCUMENTS

| | | | |
|---|---|---|---|
| 6,734,221 B1 | 5/2004 | Misiak | |
| 9,266,286 B1 * | 2/2016 | Starodubtsev | ........ B29C 64/241 |
| 9,527,245 B2 * | 12/2016 | Starodubtsev | ...... B29C 48/2552 |
| 9,707,590 B2 * | 7/2017 | Jurcevic | .............. B29C 35/0805 |
| 10,173,239 B2 * | 1/2019 | Jurcevic | .................... B05C 9/12 |
| 2002/0067608 A1 | 6/2002 | Kruse et al. | |
| 2017/0008229 A1 * | 1/2017 | Quinn | ..................... B29C 73/02 |
| 2018/0132979 A1 * | 5/2018 | Richter | ................ A61C 19/004 |

FOREIGN PATENT DOCUMENTS

| | | | | |
|---|---|---|---|---|
| CN | 204 709 447 U | 10/2015 | | |
| EP | 0 769 721 A1 | 4/1997 | | |
| EP | 1 905 415 A1 | 4/2008 | | |
| EP | 2 741 897 B1 | 7/2015 | | |
| EP | 3124509 A1 * | 2/2017 | ............. | C07F 17/02 |
| WO | 98/38260 A1 | 9/1998 | | |
| WO | 01/36380 A2 | 5/2001 | | |
| WO | 02/053666 A1 | 7/2002 | | |
| WO | 03/064483 A1 | 8/2003 | | |
| WO | 2013/064248 A2 | 5/2013 | | |
| WO | 2013/172602 A1 | 11/2013 | | |
| WO | WO-2018138546 A1 * | 8/2018 | | |
| WO | WO-2018156787 A1 * | 8/2018 | ............. | A61C 13/14 |

OTHER PUBLICATIONS

Clark Ligon et al. Polymers for 3D Printing and Customized Additive Manufacturing. Chemical Reviews 2017 117 (15), 10212-10290 (Year: 2017).*
International Search Report and Written Opinion of the International Searching Authority dated Nov. 3, 2017 in corresponding International application No. PCT/IB2017/050373; 10 pages.
"Lightlock glue Technical datasheet", Light lock glue, Oct. 2016; URL:http://www.lightlockglue.com/docs/LIGHTLOCK%20GLUE%20EN.pdf; retrieved on Oct. 17, 2017; 2 pages.
Ganster, et al., "New Photocleavable Structures. Diacylgermane-Based Photoinitiators for Visible Light Curing", Macromolecules, Apr. 2008, p. 2394-2400, vol. 41, No. 7; 7 pages.

* cited by examiner

*Primary Examiner* — Sanza L. McClendon
(74) *Attorney, Agent, or Firm* — Maier & Maier, PLLC

(57) ABSTRACT

A set including a plug connectable LED and a packaged photocurable composition. It relates also to methods for applying that article. The photocurable composition includes cyanoacrylate monomers and/or acrylate monomers, and a visible light photoinitiator system. The plug connectable LED, when connected to a host mobile device including a rechargeable battery, allows energisation of the LED so that it can be used as a convenient light source to cure the photocurable composition. The set itself does not comprise a battery or, batteries. The set is a versatile consumer product in the field of adhesives, fillers, sealants and coatings.

17 Claims, 10 Drawing Sheets

SET COMPRISING A PLUG CONNECTABLE LED AND A PHOTOCURABLE COMPOSITION

FIELD

The present invention relates to a set of articles comprising a plug connectable LED and a packaged photocurable composition, wherein the LED, when connected to a host mobile device comprising a rechargeable battery, can be used as a convenient light source to cure the photocurable composition.

BACKGROUND

Adhesives provide practical solutions for bonding parts. So-called consumer adhesives are commonly used in everyday situations to stick things together, for example in craftwork or to repair broken items. Instant adhesives or 'superglues' are a well-known class of consumer adhesive. Such adhesives are also widely used in industry due to their convenience, speed and the fact that they glue almost every type of substrate.

Superglues are derived from the chemical class of cyanoacrylate (CA) monomers that are formulated into a glue composition. These highly polarised molecules polymerise or 'cure' converting the liquid glue to a strong solid during the bonding process. In use, it appears that no stimulus is applied to invoke the curing reaction, but in fact active species, that are ubiquitous on the surfaces of parts, initiate the polymerisation of CAs. When the user changes the surface-to-volume ratio of the applied drop of instant adhesive by squeezing parts tightly together to confine the drop, the spread-out adhesive is suddenly exposed to a high concentration of such active species from two surfaces and bonding occurs rapidly. This behaviour is unique to CAs earning their reputation as 'super glues' that appear to bond 'as if by magic', in fact, the user is actually invoking 'cure-on-demand' by squeezing the parts together. However CAs do not cure instantly when present on only one substrate and furthermore any excess glue that is exuded from between squeezed parts constitutes a nuisance since it can easily instantly bond to any further substrate that contacts it such as wipes or even one's fingers. CAs clearly do not cure-on-demand on one substrate only—at least not instantaneously.

Another unrelated class of useful consumer repair products finding much popularity in the market are so-called 'liquid plastics' that cure under the action of light, as disclosed in International patent application WO-A-2013/064248, available commercially under the tradename Bondic® (www.thegadgetflow.com). These are derived from the chemical class of acrylate monomers and have been formulated with photoinitiators receptive to visible light, which is a user-friendly source of energy and used to invoke cure. Such liquid products are contained in light tight packages and sold together with battery powered light sources, such as blue light emitting diodes (LEDs). The package and LED are generally offered as a handheld tool. The LED device is powered with compact lithium based batteries and it is often detachable from the pack containing the photocurable composition, which is a squeezable tube with a cannula and a protective cap. Related products are also known with other types of batteries as disclosed in European patent application EP-A-2741897. Refill packs of liquid plastics without the LED device are also offered as part of a kit or set. The LED devices containing batteries are also offered separately.

These products provide a convenient 'cure-on-command' feature in the sense that the cure is specifically only light induced—they do not function as adhesives per se, unless at least one of the substrates to be united is transparent to visible light. Thus, these 'liquid plastics' are not glues in absence of light and they are not super glues capable of bonding a range of substrates, especially those that are opaque. In fact they are specifically marketed as 'not being a glue'. They can however be used to reinforce a joint by curing a layer of material that wraps around its periphery even if the substrates themselves are non-transparent. Similarly, unlike regular non-light sensitive CAs, they can be used to form photocured coatings atop one substrate or, to in-fill dents or holes in damaged parts when the liquid plastic is usually applied to one substrate and subsequently photocured in a layer-by-layer fashion to build up a bulk solid and fulfil a repair function.

Returning to instant adhesives, it may be logical to contemplate that there is no need for any additional cure mechanism in this class since these are readily initiated by ubiquitous surface species when joining two parts. Nevertheless certain photopolymerisable CAs have been developed and to fulfil very important needs. As such, these adhesives are CAs with an available second cure system which has been designed-in, as disclosed for example in International patent applications WO-A-98/38260 and WO-A-03/064483, and in European patent application EP-A-0769721. Such CAs possess the ability to instantly bond most every type of substrate whether transparent or not, and, have the additional feature that they can be cured-on-demand when exposed to light and most advantageously to a 'tack-free' (dry-to-touch) surface which is generally not the case for most acrylic based systems. The photocurable feature can be invoked to solidify excess materials exuded from between substrates and remove its nuisance value, or to purposely to provide reinforcement to an already physically bonded joint, or to cure CA applied to one substrate only, for example as a coating. These specialised CAs are a small subset of all CA adhesives available and are currently used in high value-added industrial markets such as electronic assembly or in medical devices for example for the bonding of display parts and hypodermic needles in syringes or for assembling hearing aid devices, as disclosed in Loctite Needle Bonding Design Guide, Henkel Corp. 2004, 2238-LT-3720 604. Such products are not found in the consumer market for a variety of reasons. The recommended storage conditions for such specialised photocurable CAs is 2-8° C., as disclosed in Loctite® 4306™ Technical Data Sheet, July 2013, which is not suitable for a consumer product in a retail channel, where products must have shelf lives of at least 12 months in normal and variable ambient conditions. The specialised CAs products that are available to date are exclusively based on ethyl cyanoacrylate (ECA), which is a lachrymator, odoursome, and its volatile vapours can stain products—features that are less readily managed in the hands of consumers, even if they are manageable in industry.

In unpublished Patent Application PCT/IB2016/051024 a non-lachrymatory, odourless alkoxyalkyl CA that is an instant adhesive and additionally may be cured by blue-violet light, and stored in ambient conditions, has been described. Such a user-friendly, dual cure adhesive is already highly suited to industrial applications where end users in Original Equipment Manufacturers (OEMs) for example purchase adhesive and use in-house irradiation means to effect photocure, e.g., on manufacturing assembly lines.

However such a dual curing, user-friendly product would also be very convenient, versatile and attractive for consumer use given the already wide acceptance of cure-on-demand 'liquid plastics' on the one hand, and utility of conventional super glues on the other. The product in question would offer the combined features of both of the latter types, particularly since it is curable with a low powered visible LED. Such a product would even offer advantages to consumers over normal lachrymatory super glues based on ECA. However, provision of compact battery powered LED devices to enable the desirable 'cure-on-demand' features, whether for special super glues or liquid plastics, itself presents problems particularly with regard to legislation associated with the packaging, transportation and disposal of battery driven devices, especially those based on lithium metal. Responsible conformance to legislation adds significantly to costs and lengthens product supply lead-times (since air transportation is complex or restricted), making the introduction and frequent replenishment of such products problematic in the fast moving consumer good sector. Aside from the aforementioned issues, devices reliant on pre-supplied non-chargeable compact batteries only function when their batteries are in good condition and batteries are known to deteriorate with time even if not in use so that on the occasions when a user needs to effect cure of a composition, there is no guarantee that a light source will function.

These are problems in need of solution to enhance the accessibility especially of a highly versatile product such as an odourless CA that is both instant adhesive and a liquid plastic as well as both user-friendly and environmentally friendly. The need to supply such a product at reasonable cost so consumers can benefit is related directly to the difficulties associated with providing an energy source to invoke photocure in a practical manner.

The object of the present invention is a set of articles used to provide, dispense and cure a photocurable composition.

Also part of the invention is a method for using that set of articles.

DETAILED DESCRIPTION OF THE INVENTION

Figure 1:
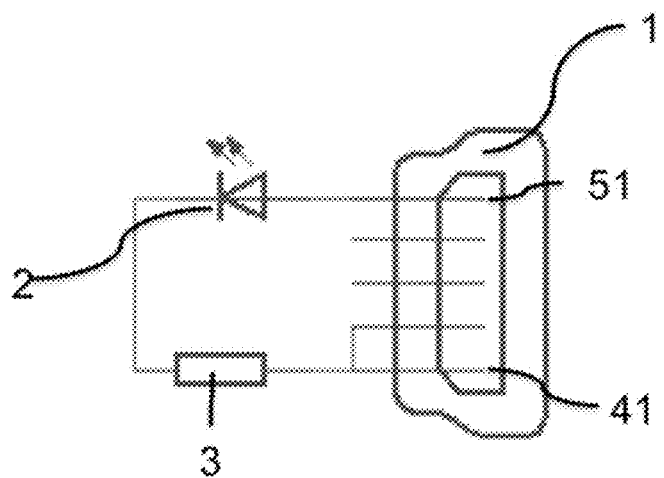
FIG. 1 illustrates a schematic representation of a circuit for a connector plug, wherein a light emitting diode 2 is wired in series with resistor 3 across the ground terminal 51 and 5V terminals, the latter shown here as connecting two terminals together.

The object of the present invention is a set of articles, used to provide, dispense and cure a photocurable composition, that comprises:

a) at least one encased light source device in a housing comprising:
  a visible light emitting diode (LED) in combination with at least one electrical element,
  a connector plug having electrical terminals designed to engage in a directly corresponding receptacle connector of a mobile device or adaptor for a mobile device, having a rechargeable battery, and
b) a packaged photocurable composition including a cap, wherein,
  the LED and at least one electrical element are positioned in the housing with the LED at one position of the housing which is an opening and said connector plug protrudes from another position of the housing, or the housed LED is positioned distant from the housed connector plug separated by a flexible cable in electrical contact with at least one element selected from the above mentioned group in either housing, and
  the LED is wired to receive at least 5V DC input obtainable from the receptacle connector of the said mobile device once charged after passing through at least one electrical element, allowing the energization of the LED.

The authors of the present invention have developed a set of articles comprising a plug connectable light emitting diode (LED) (i.e. the encased light source device in a housing comprising the LED and a connector plug) and a packaged photocurable composition that possesses at least one cure mechanism reliant on photoinitiation. The light source device when plugged into any charged mobile device, such as a mobile 'smart' phone, can be energised to emit light, which may be directed at the photocurable composition, dispensed from an independent pack, which is part of the set, to invoke cure. The set offers the advantages of reduced product cost, unrestricted transportation and quick turnaround of supply in fast moving consumer goods for versatile products such as visible light photocurable adhesives and so-called liquid plastics that otherwise must be shipped in devices that contain batteries. The set is a versatile consumer product in the field of adhesives, fillers, sealants and coatings.

DEFINITIONS

Kit or set of articles—more than one item or article used in conjunction with another.

Light sensitive, photosensitive or photocurable compositions—defines monomers and/or their formulations comprising a photoinitiator system. Said compositions may be converted from a non-solid (liquid, gel etc.) to a solid state, that is represented by the 'cured', polymerised or hardened state. Such compositions may, or may not, possess dual curing characteristics, that is, they may possess only the ability to photocure only, or, may possess the ability to cure by more than one mechanism (for example be instantly polymerisable and light curable). Such compositions are sufficiently sensitive to be cured by low powered visible LEDs (those with outputs of approximately 200 mW or less).

Cure-on-demand—defines the instigation of an action (for example, the action of light, especially, visible light, for photocuring) that transits a non-solid composition into a solidified or cured state only when the end user desires in a brief period of time (some seconds).

Housing—a casing or moulding used to contain or encase components such as a light source device comprising LED, any electrical components, connector plug etc.

Connector plug—a male connector with electrical terminals such as a Universal Serial Bus (USB) of the standard type or the micro-USB B or micro-USB C or a 'Lightning' connector for Apple Inc. devices, or tip-ring-sleeve (TRS) type audio jack plugs, that is part of a light source device, used to enable passage of electrical energy from a mobile device that has an independent power source, to the light source device.

Connector receptacle—a female connector with electrical terminals to engage or interface to micro-USB B, micro-USB C, 'Lightning' connector, or audio jack type connector plugs, the receptacle being located in mobile devices such as smart phones or tablet computers and providing electrical voltage output.

Passivated—an inert coating on a surface that may be in direct physical contact with photocurable composition that prevents any adverse reaction between the composition and the surface if otherwise uncoated.

Light source device—a visible light emitting diode (LED) with any specific associated electrical components or circuitry wired to a connector plug either all-encased in one plastic or rubber moulded shell, or, encased in two such housings where the LED is one housing and the connector is in another and both are electrically interconnected by a flexible cable. Associated circuitry or electrical components may be in any of the housings.

Micro-USB—a small connector plug with a Universal Serial Bus of type B or C in common use to connect peripheral devices to mobile devices such as chargers to smart phones for example. The connection is for electrical power and data transfer.

Lightning connector—a customised connector plug for devices from Apple Computer Inc.

Audio plug of jack—a male electrical and signal connector that may be of various types such as a TRS, wherein the sleeve is usually a ground electrode and the ring or tip may be negative or positive polarity power outputs; TRRS is a variant that enables stereo and signalling features on headsets and microphones, for example on smart phones.

Audio receptacle—the female electrical connector used to enable passage of electrical energy from a mobile device with an independent power source to a suitably interfaced device, such as a light source device, that has a corresponding male audio connector plug.

Parasitic power (parasitically powered)—meaning derived (deriving) electrical power from an independent mobile device with a charged battery that is not part of the inventive set, to feed the light source device of the set. Examples of independent mobile devices include smart phones, tablet computers, personal data assistants and also portable phone chargers that have rechargeable batteries and at least one type of connector receptacle such as a micro-USB, Lightning or audio receptacle.

Mobile device—a rechargeable portable device such as a smart phone, tablet computer, personal data assistant or a portable battery charger.

Electrical element—a component that is part of an electrical or electronic device such as a circuit component, for example a resistor, a diode, a capacitor, a microtransformer and related.

Software application or App—a computer program designed to perform a series of coordinate tasks or functions of benefit to the user.

In the present description as well as in the claims, the singular forms "a" and "an" include also the plural reference unless the context clearly indicates otherwise.

In this description, the percentages (%) are expressed in weight/weight unless otherwise indicated, and in the compositions, the sum of the percentages of the different components is adjusted to add up to 100%.

Light Emitting Diodes for Curing Photocurable Compositions

Light emitting diodes operating in the blue-violet range of the visible spectrum are most suited to the present invention. Such LEDs have substrates based on the semiconductors zinc selenide, indium gallium nitride, silicon carbide and silicon. They comprise clear moulded shells designed to boost the light emission from the semiconductor core by acting as a diffusing lens, allowing light to be emitted at a much higher angle of incidence from the light cone of the bare semiconductor chip alone. Various physical sizes of LEDs are possible. In the present invention the diameter of the LED is in the range 3-5 mm and generally only one LED is required.

The LED emits in the wavelength range of 365-430 nm, preferably in the range of 400-420 nm, with a power dissipation in the range of 100-200 mW, preferably in the range of 120-150 mW. Viewing angle of the LED ensures generally a focused light emission, preferably in the range of 10 to 20 degrees. Preferably, LED has a luminous intensity in the range of 20-~100 lm depending on angles.

Usually the electrical element combined with the LED is selected from the group consisting of: a resistor, a microtransformer, a rectifying diode bridge and a smoothing capacitor.

In a preferred embodiment, the LED is combined with a resistor.

In another preferred embodiment, the LED forms part of a circuit combined with a resistor, a microtransformer, a rectifying diode bridge and smoothing capacitors.

Connector Plugs and Receptacles

In an embodiment the set or articles may comprise an adaptor to enable connection between said connector plug and a non-corresponding receptacle connector in a mobile device having a rechargeable battery.

In a preferred embodiment, the encased light source device is attached to the package of the photocurable composition.

In another preferred embodiment, the encased light source device is separated from the package of the photocurable composition.

In a preferred embodiment the encased light source forms part of an overall package that includes an independently packaged photocurable composition, wherein the encased light source may be detached and reattached.

In a preferred embodiment the protruding connector plug on the encased light source has a protective cover that forms part of the overall package.

In a preferred embodiment, the encased light source device with plug connector is plugged into the receptacle connector of a mobile device having a rechargeable battery capable of delivering electrical power to energise the visible LED of said light source.

In a preferred embodiment, the set of articles of the invention deploys a mobile device with a rechargeable battery and a suitable receptacle for the light source device selected from the group consisting of a mobile phone, a computer, a personal data assistant and a portable phone charger.

In a preferred embodiment the encased light source device is separated by a length of flexible cable from the connector plug that has a separate housing. In this way the LED in the said light source device may be positioned freely without having to physically hold a mobile device such as a phone or tablet computer, or so that physical access is made possible for the LED in locations where it would be otherwise restricted if directly attached to a mobile device.

Rechargeable batteries are ubiquitous in modern day society in many portable devices, such as mobile smart phones, portable phone chargers, or tablet computers. Modern smart phones have various receptacle sockets that enable data transfer and electrical supply between the mobile device and peripheral devices, such as chargers, computers, earphones, memory devices, etc. Considering only electrical output supply, the USB, short for Universal Serial Bus, (regular, micro-USB type B, or C) ports enable easy access to 5 Volts DC, the typical voltage required to usefully energise an LED.

USB is an industry standard initially developed in the mid-1990s that defines the cables, connectors and communications protocols used in a bus for connection, communication, and power supply between computers and electronic devices. It is currently developed by the USB Implementers Forum (USB IF). USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smart phones, PDAs and video game consoles. USB has effectively replaced a variety of earlier interfaces, such as parallel ports, as well as separate power chargers for portable devices.

Unlike other data buses (e.g., Ethernet, HDMI), USB connections are directed, with both upstream and downstream ports emanating from a single host. This applies to electrical power, with only downstream facing ports providing power; this topology was chosen to easily prevent electrical overloads and damaged equipment. Thus, USB cables have different ends: A and B, with different physical connectors for each. Therefore, in general, each different format requires four different connectors: a plug and receptacle for each of the A and B ends. USB cables have the plugs, and the corresponding receptacles are on the computers or electronic devices. In common practice, the A end is usually the standard format, and the B side varies over standard, mini, and micro. The mini and micro formats also provide for USB On-The-Go with a hermaphroditic AB receptacle, which accepts either an A or a B plug. On-the-Go allows USB between peers without discarding the directed topology by choosing the host at connection time; it also allows one receptacle to perform double duty in space-constrained applications.

USB On-The-Go, often abbreviated to USB OTG or OTG allows USB devices, such mobile phones, to act as a host, allowing other USB devices, such as USB flash drives, digital cameras, mice or keyboards, to be attached to them. Use of USB OTG allows those devices to switch back and forth between the roles of host and device. For instance, a mobile phone may read from removable media as the host device, but present itself as a USB Mass Storage Device when connected to a host computer.

In the present invention the USB port is not used for signalling, but merely as a source of voltage. Smart phones for example, if OTG enabled, allow for parasitically powering LEDs used in the present invention to initiate photocure in photocurable compositions.

Standard USB type 2.0 or higher and micro-USB types B and C are particularly preferred for provision of parasitic power from mobile phone devices and any type of USB from mobile battery chargers.

In International patent application WO-A-2013/172602 it is disclosed a cosmetic product having a visible LED array device for whitening of teeth when used in conjunction with a chemical paste composition. The device is not parasitically powered and has a battery. It uses a USB interface but for charging directly.

In a preferred embodiment, the encased light source device is directly connected to the receptacle in a mobile device by a connector selected from a micro-USB connector and a standard USB connector. In a more preferred embodiment, the encased light source device is directly connected to the receptacle in a mobile device by a micro-USB connector.

Lightning Connector:

Not all mobile devices use USB receptacles however. Devices from Apple Inc. company, instead use so-called 'Lightning' connector plugs and receptacles. Access to 5V supply from these receptacles requires some additional simple circuitry that is present in what are known as 'MFi Certified' devices (MFi meaning 'made for iPhone®', iPad®, iPod®, etc).

The IPHONE® mobile digital device available from Apple Computer Inc. of Cupertino, Calf., USA, allows limited access to the mobile phone's internal battery and communications through a proprietary connector. Accessories designed specifically with this family of mobile digital devices are designed to work with this proprietary connector. This controlled proprietary interface allows a limited amount of power to be drawn from the mobile digital device.

Accessories, such as a light source device, have been built for direct connection to such proprietary interfaces, but may require royalty payment. An example of blue light LEDs parasitically powered by Apple iPhone® devices that is commercially available for teeth whitening when used in conjunction with non-curable chemical compositions is marketed by Nanchang Dental Bright Technologies Co. Ltd. In this product, the LEDs are separated from the connector plug housing by a flexible cable.

In a preferred embodiment, the encased light source device is directly connected or connected via an adaptor to an Apple Lightning connector plug and is energisable by permitting electrical connection to the Lightning receptacle in an Apple mobile device.

In a preferred embodiment the encased light source device is separated by a length of flexible cable from the connector plug that has a separate housing. In this way the LED in the said light source device may be positioned freely without having to physically hold a mobile device such as a phone or tablet computer, or so that physical access is made possible for the LED in locations where it would be otherwise restricted if directly attached to a mobile device.

Audio Connector:

The mobile phone is one of the most pervasive personal communications platforms yet created. Even so, among the various analogue interfaces on such mobile devices including those mentioned above, the only one that is open, standardised and widely accessible is the audio receptacle, socket or port. Nevertheless, the most current Apple iPhone® 7 no longer has an audio jack. The corresponding connector plug is also referred to as an 'audio jack'. Plug-and-play mobile phone peripherals leveraging audio connector plugs already exist, for example credit card readers from Square, Inc. and PayPal Inc. In such applications, it is important that the peripherals function on any brand of mobile device. Audio jacks are cylindrical in shape and the most modern have three, four or five contacts. Three-contact versions are so-called TRS types, already described. The more sophisticated multi-contact versions such as TRRS or even TRRRS with additional ring electrodes enable stereophonic sound and signalling, switching and microphone operation. However for power harvesting applications, as in the present invention, only two electrodes, for example a ring electrode and a ground (sleeve) electrode are needed. The most ubiquitous audio jack diameter is 3.5 mm, which is a preferred embodiment irrespective of whether it is of the TRS or TRRS type.

A circuit is necessary to amplify the voltage output from the audio receptacle, which is typically a few hundred millivolts. The circuit comprises a microtransformer, a rectifying diode bridge and a series of smoothing capacitors connected in parallel, all of which may be confined in the housing that, for example contains the LED. A suitable circuit has been described in detail by Kuo et al., Hijacking Power and Bandwidth from The Mobile Phone's Audio Interface, ACM DEV'10: Proceedings of the First ACM on Computing for Development, December 2010. In that publication, incorporated in full by reference, it is disclosed in detail how to harvest power from the universal audio socket on mobile devices from small form factor peripheral devices (~2.5 cm×2.5 cm) with a 3.5 mm audio jack connector plug. Such devices can energise light emitting diodes suitable for curing photocurable compositions of the present invention. Prototype development packs are articles of commerce, available for example from SeedStudio.com ('Hijack Development Pack SKU 1109900063) and NXP Semiconductors Inc. (Smartphone Quick-Jack Solution OM13069). Only the power harvesting features of such a circuit are necessary for the present invention.

In an alternative preferred embodiment the encased light source device is directly connected to the receptacle in a mobile device via a connector selected from an audio jack connector plug, TRS, TRRS and TRRRS.

In a preferred embodiment, the encased light source device is directly connected to the receptacle in a mobile device by 3.5 mm audio jack.

Software applications ('Apps') may be written for use in the present invention, when using a device such as a smart phone as a source of parasitic power for an LED. By interacting with an App, a user may follow, count-down and record cure times, track the number of cure cycles made etc.

In a preferred embodiment, the energisation of the encased light source device is controlled by a software application made available to a mobile device when said mobile device is a mobile phone, computer, or a personal data assistant.

Packaged Photocurable Composition

The set of articles according to the invention includes a packaged photocurable composition, which comprises:
  a) at least one cyanoacrylate monomer and/or at least one acrylate monomer, and
  b) a visible light photoinitiator system.

Cyanoacrylate Monomer

In a preferred embodiment the cyanoacrylate monomer is selected from $C_1$-$C_8$ linear or branched alkyl cyanoacrylic esters, alkoxyalkyl cyanoacrylic esters and alkylsilyloxyalkyl cyanoacrylic esters.

In a more preferred embodiment, alkoxyalkyl cyanoacrylic esters and alkylsilyloxyalkyl cyanoacrylic esters are defined by formula (I):

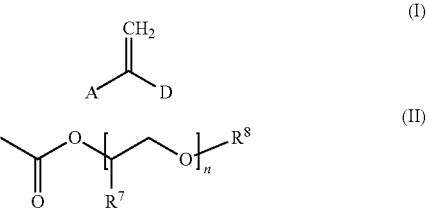

wherein A is the CN group and D is an ester group defined by formula (II), wherein n=1-3, $R^7$ is selected from the group consisting of H and Me, and $R^8$ is selected from the group consisting of $Si(Me_3)_3$, and a $C_1$-$C_6$ linear or branched alkyl chain.

Among alkoxyalkyl cyanoacrylic esters and alkylsilyloxyalkyl cyanoacrylic esters the following are preferred: 2-methoxyethyl, 2-ethoxyethyl, 2-propoxyethyl, 2-butoxyethyl, 2-isopropoxyethyl, 2-hexyloxyethyl, 2-amyloxyethyl, 2-ethoxybutyl, 2-methoxypropyl, and 2-(1-methoxy)propyl, trimethylsilyloxyethyl, hexamethyldisiloxanoxyethyl. Other examples of alkoxyalkyl type monomers are described in the International patent application WO-A-02/053666.

The alkoxyalkyl cyanoacrylates are particularly preferred in the article of the invention because they are low in odour and are non-staining and non-irritant. In a preferred embodiment, alkoxyalkyl cyanoacrylic esters are selected from 2-methoxyethyl, 2-ethoxyethyl, 2-propoxyethyl, 2-butoxyethyl, 2-isopropoxyethyl, 2-hexyloxyethyl, 2-amyloxyethyl, 2-ethoxybutyl, 2-methoxypropyl, and 2-(1-methoxy)propyl.

Unpublished PCT/IB2016/051024, which is incorporated here in full by reference, describes a blue light sensitive photocurable methoxyethyl cyanoacrylate compositions that are suitable to industrial and consumer applications since they are stable under room temperature conditions of storage and are non-irritants and have low odour characteristics. Such compositions are photocurable with the same battery driven LED devices that are used for liquid plastics.

Acrylate Monomer

In a preferred embodiment the acrylate monomer is selected from hydroxyethyl acrylate, isobornyl acrylate, poly(ethylene oxide) diacrylates, bisphenol A epoxy diacrylate, bisphenol A epoxy ethoxylated diacrylates, pentaerythritol tetraacrylate, pentaerythritol triacrylate, 1,6-hexanediol diacrylate.

These acrylate monomers are present in commercially available so-called liquid plastic products including UV and visible light photoinitiating systems, such as Bondic®, 5-Second Fix®, Blufixx®, Proformic® and MD UV-Star®. Thus far these products exploit only free radical initiation mechanisms.

Combination of Cyanoacrylate Monomers and Acrylate Monomers

Photocurable cyanoacrylate formulations may contain also acrylate monomers to constitute mixed systems that cure by independent mechanisms. That is, cyanoacrylates are initiated by nucleophilic or anionic species, whereas acrylates are initiated by free radical species. However, even though cyanoacrylates are initiated by distinct species from acrylates, the photoinitiating system they exploit usually comprises an initiator and a co-initiator, and in this case the co-initiator is in fact a free radical initiator that first decomposes to produce radicals that then react with the second compound to produce actual initiating species that are not radicals (see PCT/IB2016/051024 and references therein). Thus, in compositions containing cyanoacrylate and acrylate monomers, the photoinitiating system for the former is adequate to initiate both mechanisms of polymerisation.

Photoinitiator System

Visible light sensitive free radical initiators are well known and have been described extensively in the literature, for example, Fouassier et al., Progress in Organic Coatings, 2003, 47, 16-36, and, Shao et al., Polymer Chemistry, 2014, 5, 4195-4210.

Well-known radical photoinitiators with sensitivity in the UVA-visible region are (2,4,6-trimethylbenzoyl)diphenyl phosphine oxide, or 'TPO', defined by formula (III), and bis-(2,4,6-trimethylbenzoyl)phenylphosphine oxide) or BAPO, defined by formula (IV), the former shows sensitivity in the UVA-visible region (about 365 nm) and the latter has enhanced absorbance in the visible region up to about 425 nm:

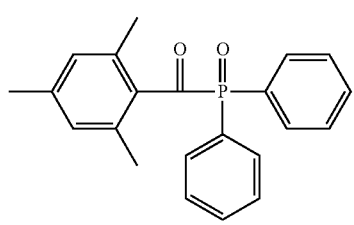

(III)

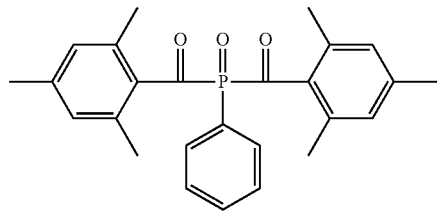

(IV)

Under irradiation in this region these acylphosphine oxide initiators form radicals by bond cleavage.

An example of a visible light initiation system that requires hydrogen atom transfer to form radicals is camphorquinone (CQ) that absorbs in the visible region (~468 nm) and requires an amine synergist. Whereas amine synergist can be used in acrylic formulations, they cannot be used in any part of the photoinitiation system of cyanoacrylate formulations due to their nucleophilicity.

Examples of photocurable compositions comprising mixtures of cyanoacrylates and acrylates are disclosed in the abovementioned unpublished PCT patent application together with reference to visible light photocurable systems based on acyl germane type photoinitiators used in conjunction with metallocenes such as ferrocene. Preferred photoinitiators and ferrocene derivatives are illustrated by structures (V) and (VI) respectively and typically in the concentration range 240-1000 ppm and, 200-300 ppm respectively:

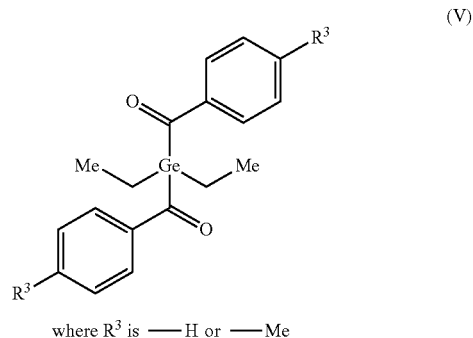

(V)

where $R^3$ is ——H or ——Me

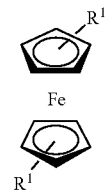

(VI)

where $R^1$ is —H

Since acyl germanes are efficient visible light photonitiators for radical polymerisation of acrylates per se (see EP-A-1905415) combinations of ferrocene with the aforementioned initiators allow efficient photoinitiation of systems comprising CAs admixed with acrylates.

In the handheld article of the invention, the photoinitiator system is selected from the group consisting of: compound of formula (V), compound of formula (III), compound of formula (IV), and combinations thereof with compound of formula (VI).

Additional Components

In a preferred embodiment, the photocurable composition comprises additionally an agent selected from the group comprising: thickeners, rheology modifiers, stabilisers, accelerators, and mixtures thereof.

Thus, photocurable formulations based on CAs may further be formulated with ingredients well known to those skilled in the art, for example poly(methyl methacrylate) and poly(vinyl chloride-co-acetate) are used to thicken (typically in range 1-8% w/w depending on target viscosity), hydrophobic fumed silica is used to build thixotropic properties if desired (typically 2-5% depending on target thixotropy and concentration of polymeric thickener if present), radical stabilisers are used such as hydroquinone or methoxy phenol (typically 50-4000 ppm and preferably 150-400 ppm), and Lewis acid stabilisers such as $BF_3$ derivatives (for example $BF_3$. etherate) and $SO_2$ (typically 3-10 ppm of pure substance). Bronsted acid stabilisers such as methane sulfonic acid (MSA) may also be used at low levels (typically 5-10 ppm). CA compositions may also contain accelerators to promote speed on porous or acidic surfaces (surfaces such as certain woods for example). Crown ethers are commonly used in the art such as dibenzo-18-crown-6, typically at concentrations of 0.1-0.2% w/w.

Photocurable acrylic formulations only require radical stabilisers such as hydroquinone or methoxy phenol or related compounds at similar concentration ranges. These may also be thickened and rendered thixotropic in the same manner as CAs.

In a preferred embodiment, the packaged photocurable composition is a coating for nails and the independent package for the photocurable composition contains a passivated brush attached to a cap.

Packaging of the Packaged Photocurable Composition

In a preferred embodiment, the packaging of the packaged photocurable composition is selected from the group consisting of:
- a light shielded high density squeezable polyolefin bottle fitted with either a light opaque passivated plastic nozzle or cannula and a light opaque removable cap,
- a light shielded high density polyolefin, or internally passivated glass bottle fitted with either a light opaque removable cap with integrated passivated brush,
- a light shielded high density polyolefin, or internally passivated glass bottle fitted with either a light opaque removable passivated squeezable cap with integrated passivated dropper,
- a light shielded high density polyolefin or passivated plastic squeezable tube fitted with a light opaque passivated plastic nozzle or cannula and a light opaque removable cap,
- a squeezable aluminium tube, optionally with an internal passivated coating, a foil sealed externally threaded neck pedestal, and an associated set containing a light opaque passivated plastic nozzle with internal threads to engage the tube pedestal and external threads to engage a light opaque removable cap, and
- a squeezable aluminium tube, optionally with an internal passivated coating with an internal cylindrical plastic insert, a foil sealed externally threaded neck pedestal, and an associated set containing a light opaque passivated plastic nozzle with internal threads to engage the tube pedestal and external threads to engage a light opaque removable cap.

In a preferred embodiment the set of articles of the invention is transported and supplied without batteries.

In a preferred embodiment the set of articles of the invention is contained in a secondary package, which more preferably is a presentation box, a presentation tin, a folding cardboard box or a blister pack.

Operation of the Set

FIG. 1a illustrates schematically a micro-USB connector plug 1 with a visible light emitting diode 2 wired in series with a resistor 3 across the ground terminal 51 and terminals connected together at 41 that will receive 5V DC supply from a charged mobile device with a corresponding micro-USB receptacle.

Figure 2A:
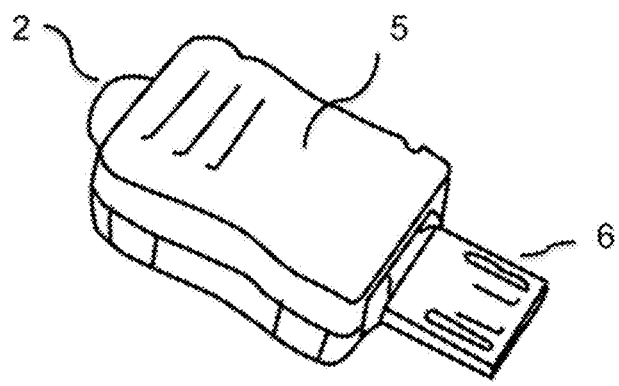
in FIG. 2a the plug is a micro-USB type connector 6.

FIG. 2a illustrates the light source device in another view showing the LED 2 protruding from one opening in housing 5 and the male micro-USB connector plug 6 protruding from the housing or casing.

Figure 8A:
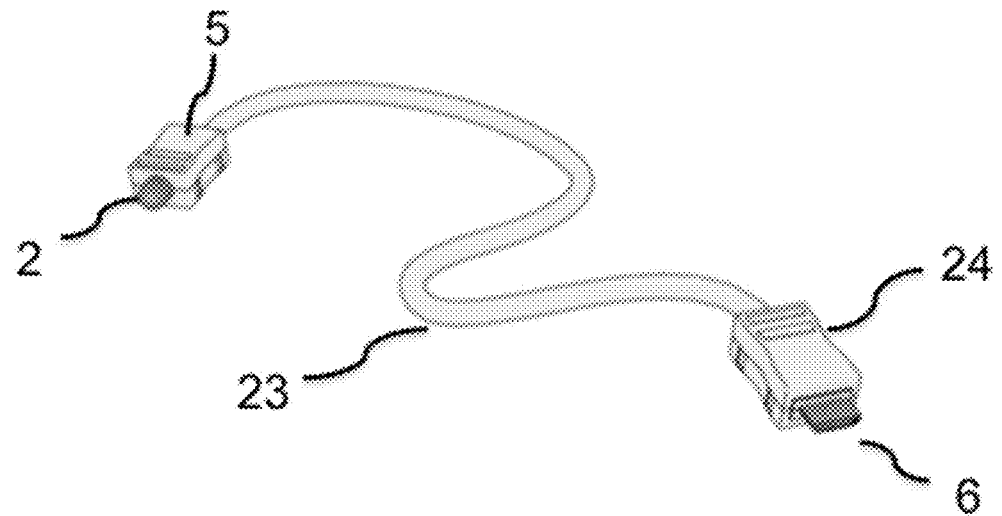
FIG. 8 represents a schematic representation of a light source device 5 housed at one end of a flexible cable and a connector plug 6 housed at the other end of a flexible cable, in FIG. 8a the connector plug is a micro-USB type 6; and in FIG. 8b the connector plug is a TRS audio jack type 6'.

FIG. 8a shows an alternative embodiment wherein the LED device is in a separate housing from the connector plug that has its own housing 24, yet the LED and connector plug are still electrically connected by a flexible cable 23.

Figure 3:
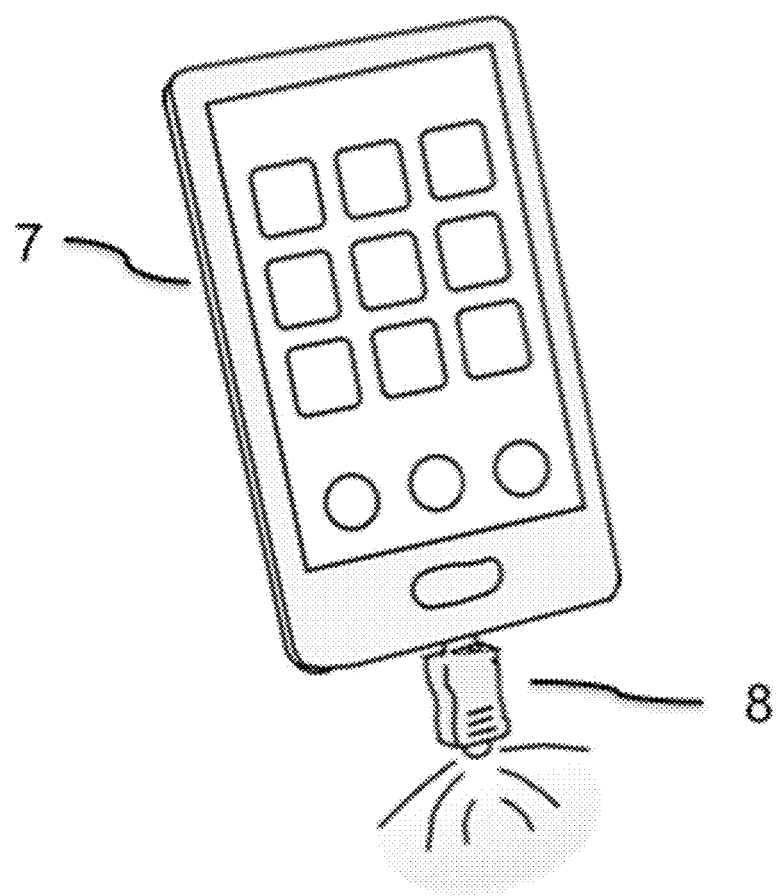
FIG. 3 illustrates a schematic representation of a portable handheld smart phone device that has a rechargeable battery (not shown) energising a connected light source device directed towards a drop of photocurable composition.

FIG. 3 illustrates schematically how one type of light source device 8, may be energised by exploiting an independent mobile device such as a mobile phone 7 that is understood to have a charged battery.

The embodiments shown in FIG. 2 or 8 apply equally in this regard.

In FIG. 9, a portable battery charger is used power the preferred LED light source.

Figure 2B:
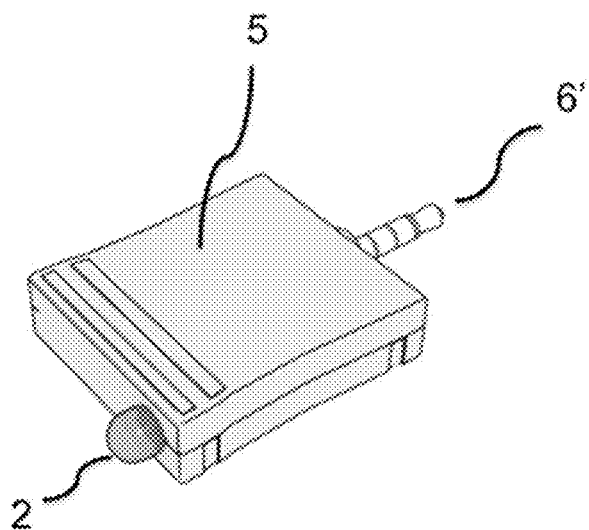
in FIG. 2b the plug is a TRS audio jack type connector 6'; and in FIG. 2c an open version of FIG. 2b schematically illustrating electrical components in a circuit inside.
Figure 2C:
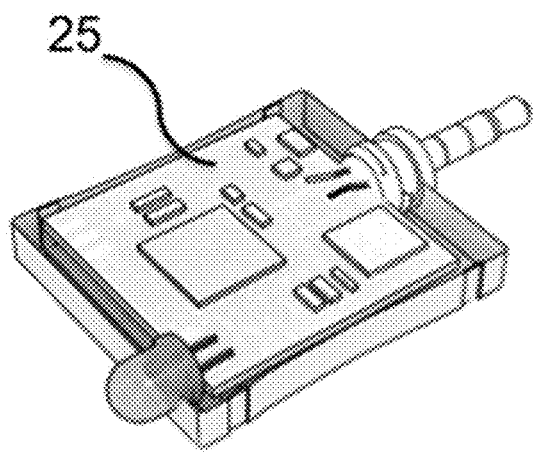
FIG. 2 illustrates schematic representations of a housed light source device 5 comprising a visible light emitting diode 2 positioned at one opening of the device and a connector plug protruding from another position of the device.

FIG. 2c, item 25 shows a schematic representation of the location of the required circuit described by Kuo et al.

FIG. 2b illustrates the light source device in another view showing LED 2 protruding from housing 5 and the male 3.5 mm TRS connector plug 6' protruding from the housing or casing, 24.

Figure 8B:
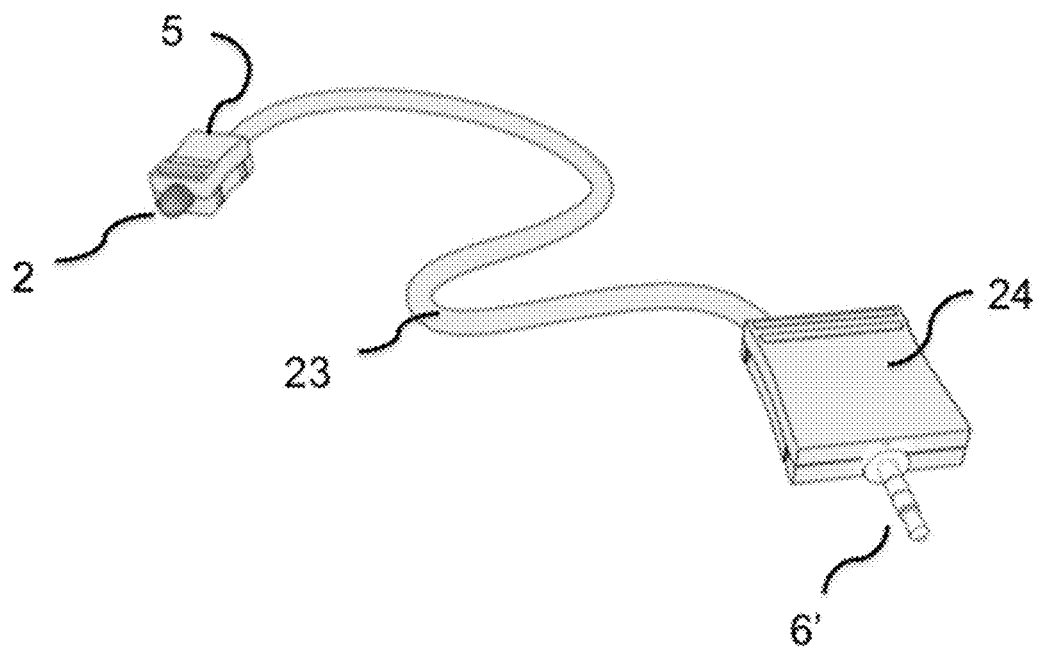

FIG. 8b shows an alternative embodiment wherein the LED device is in a separate housing from the connector plug that has its own housing 24, yet the LED and connector plug are still electrically connected by a flexible cable 23. Such a light source device may also be connected to a mobile device to enable photocure of a photosensitive composition.

Figure 4:
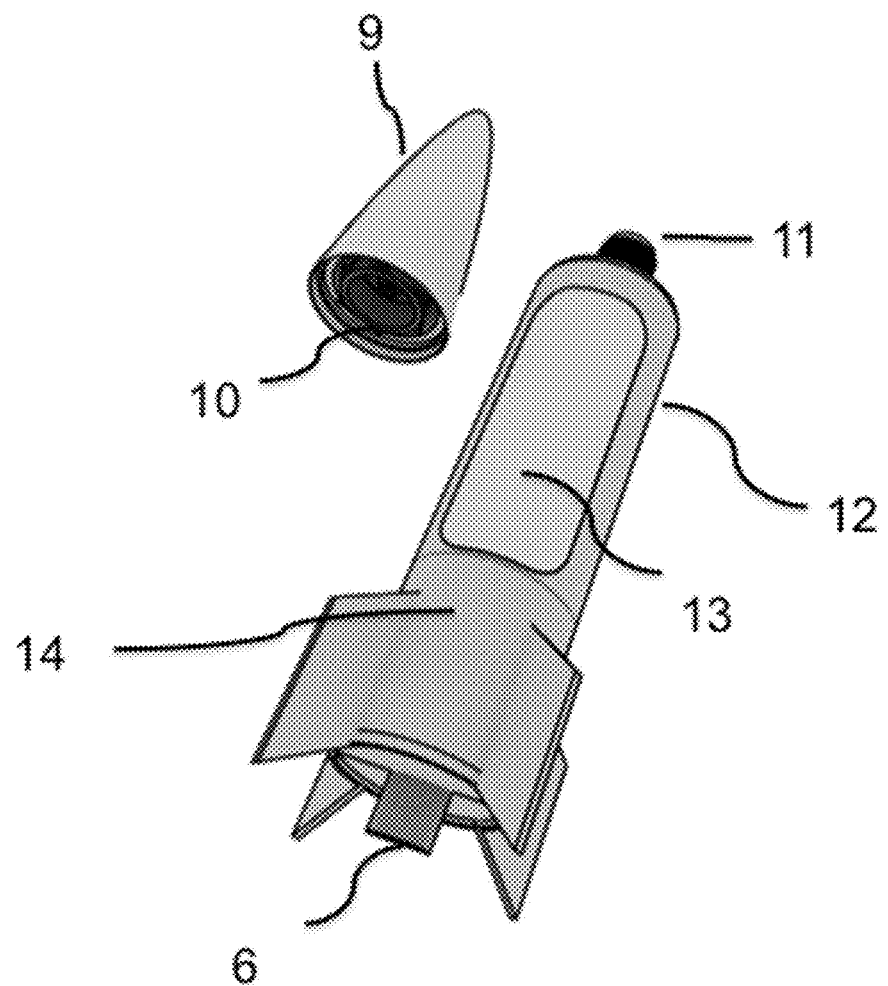
FIG. 4 illustrates a schematic representation of a photo-curable composition pack with a light opaque removable cap 9, passivated nozzle 10 with internal threads, threaded pedestal 11 on tube (obscured), squeezable side panels 13, detachable or separable light source device with one type of connector plug 6.
Figure 5:
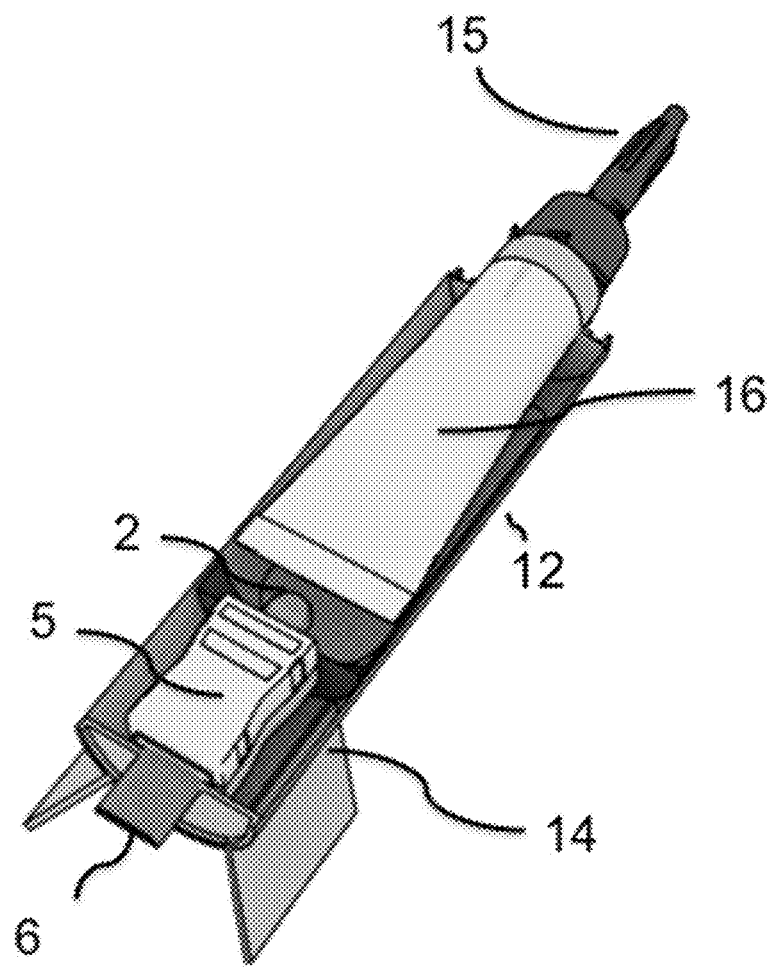
FIG. 5 illustrates a schematic cut away representation of photocurable composition pack, illustrating internal collapsible aluminium tube 16, passivated nozzle screwed atop tube pedestal (obscured), attached light source device linked to pack, and showing housed light source device 5 with light emitting diode 2 and one type of connector plug 6.

FIGS. 4 and 5 describe an embodiment wherein the light source device is incorporated into the packaging of the photosensitive composition itself for convenience.

FIG. 4 shows a casing 12 with squeezable side panels 13, encasing a tube (not shown) with an externally threaded foil sealed pedestal 11. The package has a replaceable cover or cap 9 that has a nozzle 10 within. The nozzle has external threads to enable engagement into the cap, and internal threads that engage onto the foil sealed pedestal 11 to piece it and enable the composition to be dispensed. The package also has a casing that houses a light source device with a protruding connectable plug 6.

FIG. 5 shows a cut-away view of the casing 12 where the tube 16 containing the photocurable composition is visible and the nozzle 15 is connected to the tube. Also visible is the disposition of the light curable device showing the housing 5, LED 2 and connector plug 6.

Figure 6A:
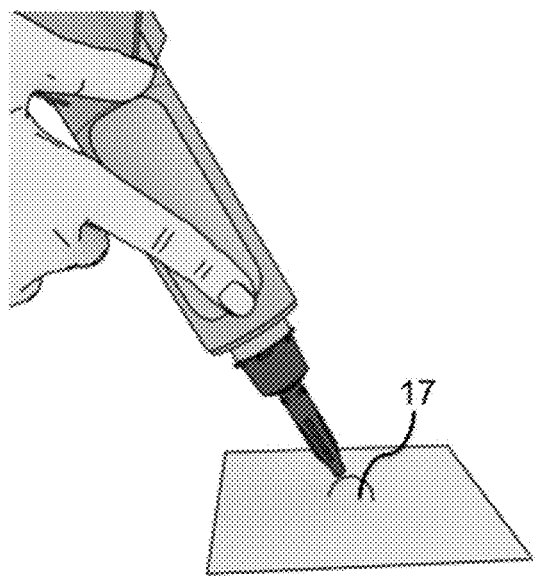
FIG. 6 discloses a representation of dispensing a drop of photocurable composition in FIG. 6a; and a schematic representation of photocuring a dispensed composition by means of a smart phone device containing rechargeable batteries (not shown) to which is connected a light source device in FIG. 6b.

FIG. 6a shows dispensing of the photocurable composition 17.

Figure 6B:
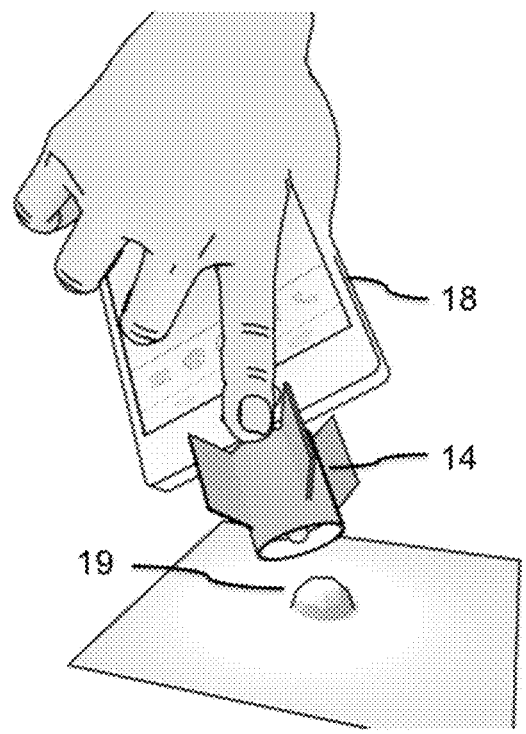

FIG. 6b illustrates subsequent photocuring of the dispensed composition wherein the irradiated drop 19 is now cured following engagement of a separable part of the package 14 containing the light source device attached to a charged mobile device 18, schematically illustrated here as a mobile phone. It is understood that the connector plug may be of any of the types already described.

Figure 7:
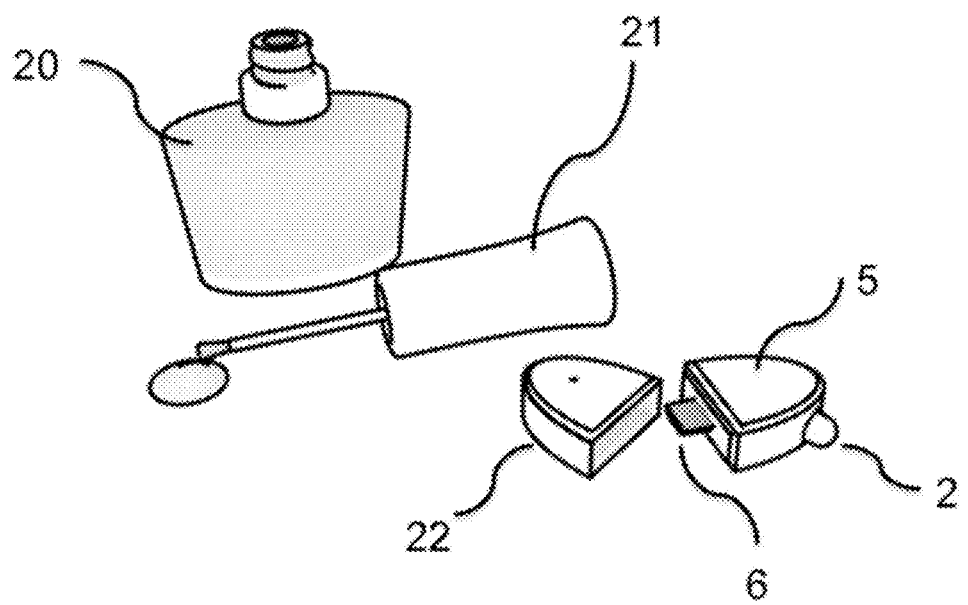
FIG. 7 discloses a schematic representation of a type of pack for a photocurable composition that is a bottle 20 with a brush cap 21 and in which the housed light source device 5 is detachable from said pack and is shown here with the protruding connector plug 6 protected by a cover 22.

FIG. 7 represents an embodiment wherein the packaged photosensitive composition is contained in a light opaque bottle 20, passivated inside if necessary, with a brush-cap 21. The light source device is detachable from the bottle and cover 22 protects the connector plug. Such an embodiment is suited to the application of top-coats for light curing nail varnishes for example.

In a further embodiment the light source device may be fashioned in a moulded housing that has some marketing relevance to the vendor of the light sensitive composition as part of the set. For example the light source device may be encased, in the same manner as found with common USB flash memory drives, in a novelty moulding such as the logo of the vendor, or an object obviously associated with the vendor's brand. In such an embodiment, the connector plug may be of any type described and may have a removable cover that forms part of the design of the moulding.

Figure 9A:
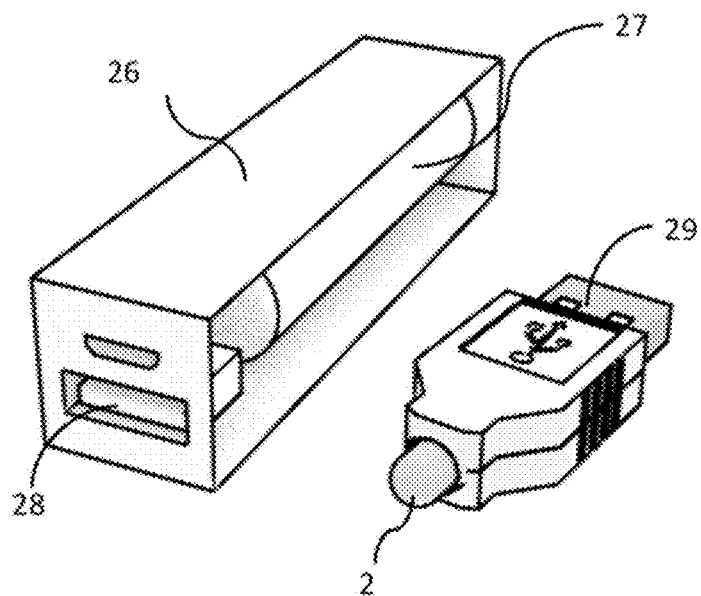
FIG. 9 represents a schematic representation of a portable rechargeable battery charger device 26 with exposed view of rechargeable battery 27 and with a USB port receptacle 28 and an LED device with a corresponding USB plug 29 in FIG. 9a; and a schematic representation of a rechargeable portable battery charger with LED 2 attached in FIG. 9b.

FIG. 9a schematically illustrates a portable battery charger 26 that may be used as a parasitic source of power. These contain a rechargeable battery 27 and have a receptacle 28 for a standard USB plug 29.

Figure 9B:
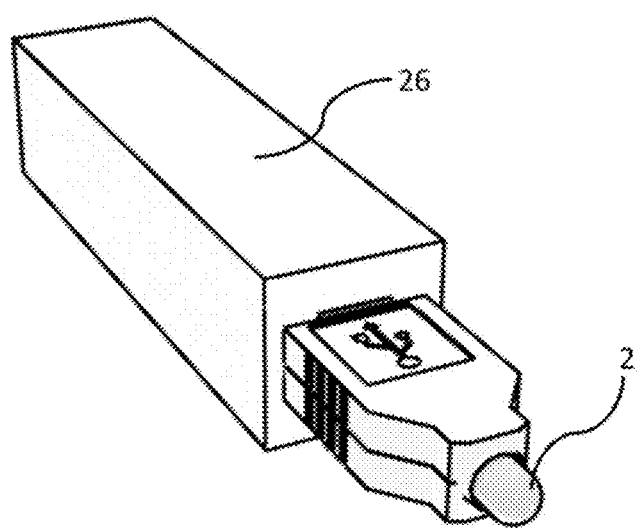

FIG. 9b schematically illustrates an embodiment where the housed LED2 is plugged into the mobile battery charger.

Figure 10A:
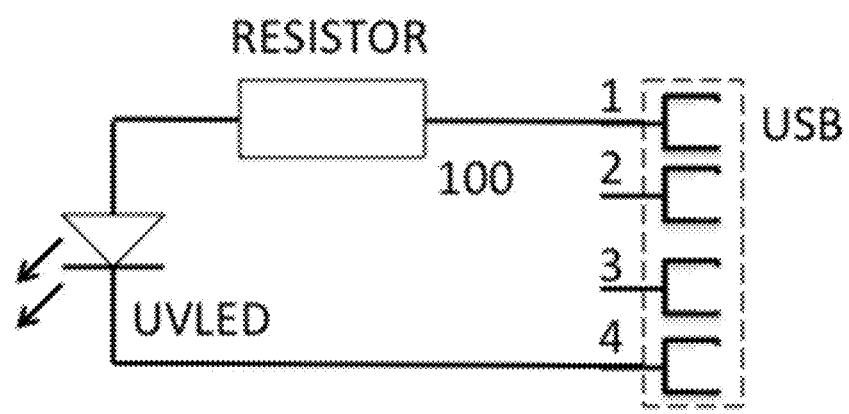
FIG. 10 represents the electrical connection for an LED to a standard USB connector in FIG. 10a; and schematic representation of the connections for the LED to a standard USB connector in FIG. 10b.

The wiring circuit for standard USB connectors is shown in FIG. 10a containing connection of a 100 Ohm resistor. The wiring differs slightly for standard USB connectors relative to micro-USB versions (FIG. 1).

Figure 10B:
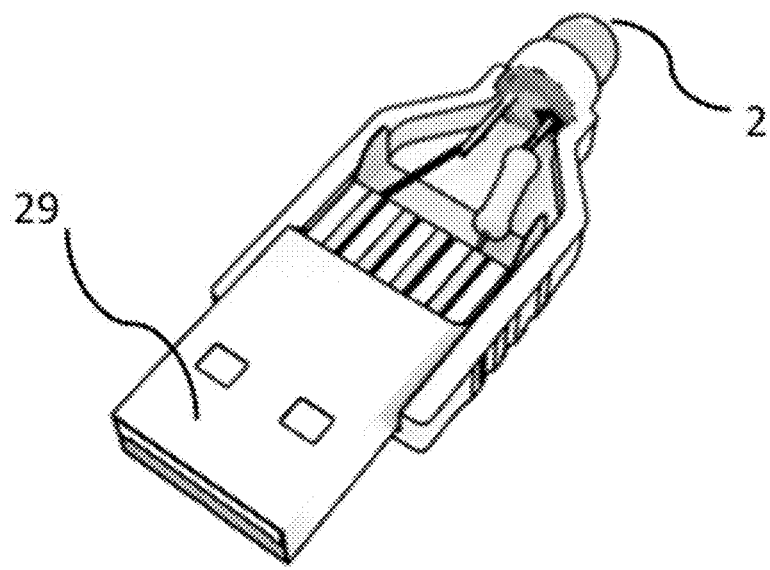

FIG. 10b show a schematic of a housed LED 2 with resistor connected to USB plug 29.

Method for Using the Article

A method for using a set of articles of the invention also forms part of the invention.

The method for using the set of articles of the invention comprises the steps of:
1) removing the cap of a packaged photocurable composition,
2) dispensing or spreading photocurable composition to at least one part or substrate
3) assembling, coating, reinforcing, or sealing parts or substrates using dispensed or spread photocurable composition,
4) optionally re-closing dispensed photocurable composition,
5) optionally detaching encased light source article if attached to packaged photosensitive composition,
6) connecting encased light source directly into or, via an adaptor then into, a mobile device with sufficiently charged battery and energising the visible LED of said light source,
7) directing the emitted visible light at any accessible dispensed or spread photocurable composition for sufficient time to invoke cure thereof,
8) removing the encased light source and any adaptor if present from the mobile device, and
9) optionally reattaching the encased light source to the packaged photocurable composition.

In a preferred embodiment, in the method of the invention a mobile device with a rechargeable battery is used as a source of visible illumination to invoke cure of a photocurable composition.

In a preferred embodiment, in the method of the invention a mobile device with a rechargeable battery is used as a source of visible illumination that utilises a plugged in visible light emitting diode light source device emitting light in the wavelength range 400-420 nm to invoke cure of a photocurable composition.

Thus, the invention discloses a set of articles used to provide, dispense and enable cure of a photocurable composition comprising an encased light source device and a packaged photocurable composition. The advantage of that set is that the encased light source device is designed to derive the electrical power necessary to energise it from independent mobile devices that possess charged batteries and have at least one connector receptacle that interfaces to the light source device. The visible light emitted from the light source device is designed to efficiently cure a once dispensed photosensitive composition that is based on cyanoacrylate monomers and/or acrylate monomers.

The invention comprises the following embodiments:

1.—A set of articles used to provide, dispense and cure a photocurable composition, characterized in that it comprises:
 a) at least one encased light source device in a housing comprising:
  a visible light emitting diode (LED) in combination with at least one electrical element, and
  a connector plug having electrical terminals designed to engage in a directly corresponding receptacle connector of a mobile device or adaptor for a mobile device, having a rechargeable battery, and
 b) a packaged photocurable composition including a cap, wherein,
  the LED and at least one electrical element are positioned in the housing with the LED at one position of the housing which is an opening and said connector plug protrudes from another position of the housing, or
  the housed LED is positioned distant from the housed connector plug separated by a flexible cable in electrical contact with at least one element selected from the above mentioned group in either housing, and
  the LED is wired to receive at least 5V DC input obtainable from the receptacle connector of the said mobile device once charged after passing through at least one electrical element, allowing the energisation of the LED.

2.—A set of articles according to embodiment 1, characterized in that the electrical element is selected from the group consisting of: a resistor, a microtransformer, a rectifying diode bridge and a smoothing capacitor.

3.—A set of articles according to embodiment 2, characterized in that the LED is combined with a resistor.

4.—A set of articles according to embodiment 2, characterized in that the LED is combined with a resistor, a microtransformer, a rectifying diode bridge and smoothing capacitors.

5.—A set of articles according to embodiment 1, characterized in that it comprises an adaptor to enable direct connection between said connector plug and a non-corresponding receptacle connector in a mobile device having a rechargeable battery.

6.—A set of articles according to embodiment 1, characterized in that the encased light source device is attached to the package of the photocurable composition.

7.—A set of articles according to embodiment 1, characterized in that the encased light source device is separated from the package of the photocurable composition.

8.—A set of articles according to embodiment 1, characterized in that the encased light source forms part of an overall package that includes an independently packaged photocurable composition, wherein the encased light source may be detached and reattached.

9.—A set of articles according to embodiment 1, characterized in that the protruding connector plug on the encased light source has a protective cover that forms part of the overall package.

10.—A set of articles according to embodiment 1, characterized in that the encased light source device with plug connector is plugged into the receptacle connector of a mobile device having a rechargeable battery capable of delivering electrical power to energise the visible LED of said light source.

11.—A set of articles according to embodiment 1, characterized in that it deploys a mobile device with a rechargeable battery and a suitable receptacle for the light source device selected from the group consisting of a mobile phone, a computer, a personal data assistant and a portable phone charger.

12.—A set of articles according to embodiment 1, characterized in that the encased light source device is directly connected to the receptacle in a mobile device by a connector selected from a micro-USB connector and a standard USB connector.

13.—A set of articles according to embodiment 12, characterized in that the encased light source device is directly connected to the receptacle in a mobile device by a micro-USB connector.

14.—A set of articles according to embodiment 1, characterized in that the encased light source device is directly connected or connected via an adaptor to an Apple Lightning connector plug and is energisable by permitting electrical connection to the Lightning receptacle in an Apple mobile device.

15.—A set of articles according to any one of embodiments 1 to 14, characterized in that the encased light source device is separated by a length of flexible cable from the connector plug that has a separate housing.

16.—A set of articles according to embodiment 1, characterized in that the encased light source device is directly connected to the receptacle in a mobile device via a connector selected from an audio jack connector plug, TRS, TRRS and TRRRS.

17.—A set of articles according to embodiment 16, characterized in that the encased light source device is directly connected to the receptacle in a mobile device by 3.5 mm audio jack connector plug.

18.—A set of articles according to embodiment 1, characterized in that the energisation of the encased light source device is controlled by a software application made available to a mobile device when said mobile device is a mobile phone, computer, or a personal data assistant.

19.—A set of articles according to any one of embodiments 1 to 18, characterized in that it is transported and supplied without batteries.

20.—A set of articles according to any one of embodiments 1 to 19, characterized in that it is contained in a secondary package.

21.—A set of articles according to embodiment 20, characterized in that the secondary package is a presentation box, a presentation tin, a folding cardboard box or a blister pack.

22.—A set of articles according to any one of embodiments 1 to 21, characterized in that the packaged photocurable composition comprises:
   a) at least one cyanoacrylate monomer and/or at least one acrylate monomer, and
   b) a visible light photoinitiator system.

23.—A set of articles according to embodiment 22, characterized in that the photocurable composition comprises additionally an agent selected from the group comprising: thickeners, rheology modifiers, stabilisers, accelerators, and mixtures thereof.

24.—A set of articles according to embodiment 22 or 23, characterized in that the cyanoacrylate monomer is selected from $C_1$-$C_8$ linear or branched alkyl cyanoacrylic esters, alkoxyalkyl cyanoacrylic esters and alkylsilyloxyalkyl cyanoacrylic esters.

25.—A set of articles according to embodiment 24, characterized in that the alkoxyalkyl cyanoacrylic esters are selected from 2-methoxyethyl, 2-ethoxyethyl, 2-propoxyethyl, 2-butoxyethyl, 2-isopropoxyethyl, 2-hexyloxyethyl, 2-amyloxyethyl, 2-ethoxybutyl, 2-methoxypropyl, and 2-(1-methoxy)propyl.

26.—A set of articles according to embodiment 22 or 23, characterized in that the acrylate monomer is selected from hydroxyethyl acrylate, isobornyl acrylate, poly(ethylene oxide) diacrylates, bisphenol A epoxy diacrylate, bisphenol A epoxy ethoxylated diacrylates, pentaerythritol tetraacrylate, pentaerythritol triacrylate, 1,6-hexanediol diacrylate.

27.—A set of articles according to any one of embodiments 22 to 26, characterized in that the photoinitiator system is selected from the group consisting of:

an acyl germane photoinitiator of structure (V)

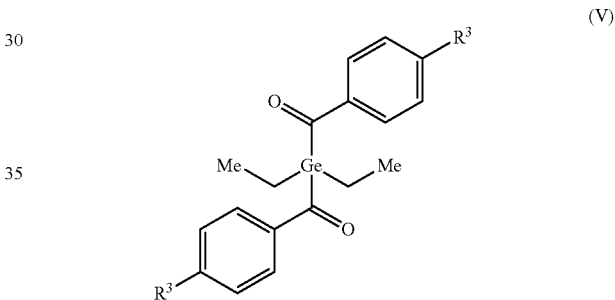

wherein $R^3$ is —H or -Me an acyl phosphine oxide selected from (2,4,6-trimethylbenzoyl) diphenyl phosphine oxide (structure (III)) or bis(2,4,6-trimethylbenzoyl) phenylphosphine oxide (structure (IV)),

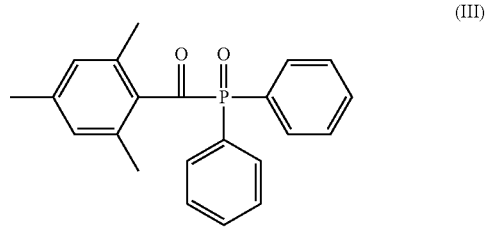

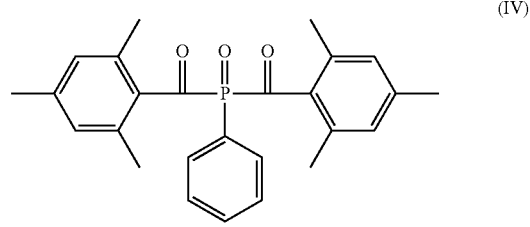

and
combinations of either acyl germane of formula (V) or acyl phosphine oxide of formula (III) or (IV) with a ferrocene of structure (VI):

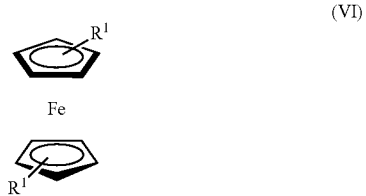

(VI)

where $R^1$ is —H

28.—A set of articles according to any one of embodiments 1 to 27, characterized in that, the packaging of the packaged photocurable composition is selected from the group consisting of:
- a light shielded high density squeezable polyolefin bottle fitted with either a light opaque passivated plastic nozzle or cannula and a light opaque removable cap,
- a light shielded high density polyolefin, or internally passivated glass bottle fitted with either a light opaque removable cap with integrated passivated brush,
- a light shielded high density polyolefin, or internally passivated glass bottle fitted with either a light opaque removable passivated squeezable cap with integrated passivated dropper,
- a light shielded high density polyolefin or passivated plastic squeezable tube fitted with a light opaque passivated plastic nozzle or cannula and a light opaque removable cap,
- a squeezable aluminium tube optionally with an internal passivated coating, a foil sealed externally threaded neck pedestal, and an associated set containing a light opaque passivated plastic nozzle with internal threads to engage the tube pedestal and external threads to engage a light opaque removable cap, and
- a squeezable aluminium tube optionally with an internal passivated coating with an internal cylindrical plastic insert, a foil sealed externally threaded neck pedestal, and an associated set containing a light opaque passivated plastic nozzle with internal threads to engage the tube pedestal and external threads to engage a light opaque removable cap.

29.—A set of articles according to embodiment 1, characterized in that the packaged photocurable composition is a coating for nails and the package for the photocurable composition contains a passivated brush attached to a cap.

30.—A method for using a set of articles of embodiment 1, characterized in that it comprises the steps of:
1) removing the cap of a packaged photocurable composition,
2) dispensing or spreading photocurable composition to at least one part or substrate,
3) assembling, coating, reinforcing, or sealing parts or substrates using dispensed or spread photocurable composition,
4) optionally re-closing dispensed photocurable composition,
5) optionally detaching encased light source article if attached to packaged photosensitive composition,
6) connecting encased light source directly into or, via an adaptor then into, a mobile device with sufficiently charged battery and energising the visible LED of said light source,
7) directing the emitted visible light at any accessible dispensed or spread photocurable composition for sufficient time to invoke cure thereof,
8) removing the encased light source and any adaptor if present from the mobile device, and
9) optionally reattaching the encased light source to the packaged photocurable composition.

31.—A method according to embodiment 30, characterized in that a mobile device with a rechargeable battery is used as a source of visible illumination to invoke cure of a photocurable composition.

32.—A method according to embodiment 31, characterized in that a mobile device with a rechargeable battery is used as a source of visible illumination that utilises a plugged in visible light emitting diode light source device emitting light in the wavelength range 400-420 nm to invoke cure of a photocurable composition.

Next, several examples of the invention are provided for illustrative purposes that are understood to be non-limiting.

EXAMPLES

Example 1: Preparation of Light Sensitive Odourless CA

A sample of a photocurable odourless CA was prepared according to the methods described in PCT/IB2016/051024, for example, by mixing CA monomer, thickener, metallocene and germane species at room temperature in light shielded opaque high-density polyethylene (HDPE) bottles. Stock solutions and dilutions were used to ensure accuracy of transfer of any species used in low concentrations. Ferrocene was used at a concentration of 200 ppm and the germane species known as Ivocerin™ (Synthon Chemicals GmbH & Co. KG) at a concentration of 750 ppm. Methoxymethyl CA monomer was synthesized according to a known method, as the one described, for example, in International patent application WO-A-01/36380.

The quantitative composition of the formulation is disclosed in Table I:

TABLE I

| Component | Material | Function | Percentage by weight |
|---|---|---|---|
| 1 | Methoxyethyl CA | Monomer | 92.905 |
| 2 | Poly(vinyl chloride-co-acetate) | Thickener | 7.0 |
| 3 | Ferrocene | Synergist | 200 ppm |
| 4 | Ivocerin ™ | Photoinitiator | 750 ppm |
| | TOTAL | | 100.0 |

Checks on photocurability were made on the formulation using a LED operating at 410 nm with a power dissipation of 120 mW and a luminous intensity of ~60 lm (at cone angle of 10°). The diode was provided by Tongjia Optoelectronics Technology Co., Ltd. A dispensed drop of the formulation cured in approximately 3 seconds after irradiating with the LED held approximately 5 cm from the sample. After photocure, the cured sample was completely dry to touch.

Example 2: Preparation of a Light Source

A commercial USB cable was used to furnish a housing for the light source device by cutting open the commercial casing and removing its content.

A visible LED emitting in the wavelength region 400-420 nm with a luminous output of approximately 120 mW (available from BIVAR Ltd) was soldered with its anode to the ground terminal (first terminal) of a stainless steel micro-B USB connector plug (available from Molex). The cathode was soldered to a 50 Ohm resistor which was in turn soldered to the fifth and final terminal of the USB connector plug. The fourth and fifth terminals of the connector were wired together. The LED, resistor and connector plug were inserted into the opened casing, which was glued back together. The resulting article was a compact device with an LED at an opening on one end and a micro-B USB plug connector protruding from the other end. This constituted a light source device of the invention in one embodiment. A version with a flexible cable was readily prepared using two casings from existing micro-B USB cables wherein one houses the LED and resistor, and the other houses the connector plug and the connections to the between the components are made as previously described except with a long wires 200 mm in length and sheathed in a plastic sleeve.

When either of the thus prepared lights source devices were plugged into a Smart Phone with a micro-B USB receptacle connector and with its internal battery charged, the LED illuminated and emitted light.

Example 3: Use of a Light Source Device to Cure-On-Demand a Photocurable Composition The composition of Example 1 was dispensed on a substrate in subdued room lighting conditions in a series of dots about 5 mm in diameter. The compact version of the light source device of Example 2 was inserted into a fully charged Smart Phone. The LED illuminated emitting light in the wavelength range of 400-420 nm and with approximately 120 mW intensity. The energised light source device was held approximately 3-5 cm directly above some of the dispensed photocurable composition for approximately 3-5 seconds. The light source device was removed from the Smart Phone and thus powered off. The dispensed dots of photocurable composition that were irradiated were fully cured and dry to the touch, whereas those that were not irradiated were mobile liquids and not cured.

The same experiment could be performed equally with a commercially available liquid plastic composition (Bondic®). The battery powered LED provided with the liquid plastic commercial product was not used.

The invention claimed is:

1. A set of articles used to provide, dispense and cure a photocurable composition comprising:
   a) at least one encased light source device in a housing comprising:
      a visible light emitting diode (LED) in combination with at least one electrical element, and
      a connector plug having electrical terminals designed to engage in a directly corresponding receptacle connector of a mobile device or adaptor for a mobile device, said mobile device having a rechargeable battery, and
   b) a packaged photocurable composition including a cap, wherein,
   the LED and at least one electrical element are positioned in the housing with the LED at one position of the housing which is an opening and said connector plug protrudes from another position of the housing, or
   the housed LED is positioned distant from the housed connector plug separated by a flexible cable, and
   the LED is wired to receive at least 5V DC input from the receptacle connector of the said mobile device once charged after passing through at least one electrical element, allowing the energisation of the LED.

2. The set of articles according to claim 1, wherein the electrical element is selected from the group consisting of: a resistor, a microtransformer, a rectifying diode bridge and a smoothing capacitor.

3. The set of articles according to claim 1, wherein the encased light source device is attached to the package of the photocurable composition.

4. The set of articles according to claim 1, wherein the encased light source device is separated from the package of the photocurable composition.

5. The set of articles according to claim 1, wherein the encased light source forms part of an overall package that includes an independently packaged photocurable composition, wherein the encased light source may be detached and reattached to said package.

6. The set of articles according to claim 1, wherein the encased light source device with plug connector is plugged into the receptacle connector of a mobile device having a rechargeable battery, which delivers electrical power to energise the visible LED of said light source.

7. The set of articles according to claim 1, wherein the mobile device is selected from the group consisting of a mobile phone, a computer, a personal data assistant and a portable phone charger.

8. The set of articles according to claim 1, wherein the encased light source device is directly connected to the receptacle in a mobile device by a connector selected from a micro-USB connector and a standard USB connector.

9. The set of articles according to claim 1, wherein the encased light source device is directly connected or connected via an adaptor to an Apple Lightning connector plug and is energisable by permitting electrical connection to the Lightning receptacle in an Apple mobile device.

10. The set of articles according to claim 1, wherein the encased light source device is separated by a length of flexible cable from the connector plug that has a separate housing.

11. The set of articles according to claim 1, wherein the encased light source device is directly connected to the receptacle in a mobile device via a connector selected from an audio jack connector plug, TRS, TRRS and TRRRS.

12. The set of articles according to claim 1, wherein the set of articles is contained in a secondary package selected from a presentation box, a presentation tin, a folding cardboard box or a blister pack.

13. The set of articles according to claim 1, wherein the packaged photocurable composition comprises:
   a) at least one cyanoacrylate monomer and/or at least one acrylate monomer, and
   b) a visible light photoinitiator system.

14. The set of articles according to claim 13, wherein the cyanoacrylate monomer is selected from $C_1$-$C_8$ linear or branched alkyl cyanoacrylic esters, alkoxyalkyl cyanoacrylic esters and alkylsilyloxyalkyl cyanoacrylic esters.

15. The set of articles according to claim 13, wherein the photoinitiator system is selected from the group consisting of:

an acyl germane photoinitiator of structure (V)

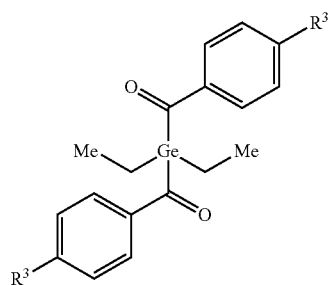

wherein $R^3$ is —H or —Me an acyl phosphine oxide selected from (2,4,6-trimethylbenzoyl) diphenyl phosphine oxide (structure (III)) or bis(2,4,6-trimethylbenzoyl) phenylphosphine oxide (structure (IV)),

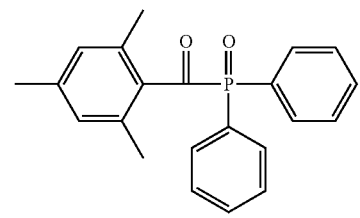

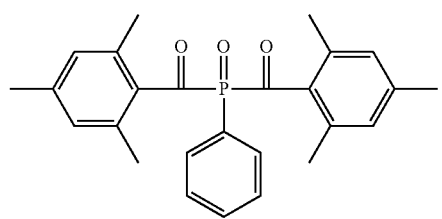

and combinations of either acyl germane of formula (V) or acyl phosphine oxide of formula (III) or (IV) with a ferrocene of structure (VI):

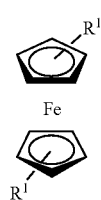

where $R^1$ is —H.

16. The set of articles according to claim 1, wherein, the packaging of the packaged photocurable composition is selected from the group consisting of:
   a light shielded high density squeezable polyolefin bottle fitted with either a light opaque passivated plastic nozzle or cannula and a light opaque removable cap,
   a light shielded high density polyolefin, or internally passivated glass bottle fitted with either a light opaque removable cap with integrated passivated brush,
   a light shielded high density polyolefin, or internally passivated glass bottle fitted with either a light opaque removable passivated squeezable cap with integrated passivated dropper,
   a light shielded high density polyolefin or passivated plastic squeezable tube fitted with a light opaque passivated plastic nozzle or cannula and a light opaque removable cap,
   a squeezable aluminium tube optionally with an internal passivated coating, a foil sealed externally threaded neck pedestal, and an associated set containing a light opaque passivated plastic nozzle with internal threads to engage the tube pedestal and external threads to engage a light opaque removable cap, and
   a squeezable aluminium tube optionally with an internal passivated coating with an internal cylindrical plastic insert, a foil sealed externally threaded neck pedestal, and an associated set containing a light opaque passivated plastic nozzle with internal threads to engage the tube pedestal and external threads to engage a light opaque removable cap.

17. A method for using the set of articles of claim 1, wherein comprising the steps of:
   1) removing the cap of a packaged photocurable composition,
   2) dispensing or spreading photocurable composition to at least one part or substrate,
   3) assembling, coating, reinforcing, or sealing parts or substrates using dispensed or spread photocurable composition,
   4) optionally re-closing dispensed photocurable composition,
   5) optionally detaching encased light source article if attached to packaged photosensitive composition,
   6) connecting encased light source directly into or, via an adaptor then into, a mobile device with sufficiently charged battery and energising the visible LED of said light source,
   7) directing the emitted visible light at any accessible dispensed or spread photocurable composition for sufficient time to invoke cure thereof,
   8) removing the encased light source and any adaptor if present from the mobile device, and
   9) optionally reattaching the encased light source to the packaged photocurable composition.

* * * * *